A. H. MINNICH.
ROD OR PIPE COUPLING.
APPLICATION FILED AUG. 8, 1914.
1,193,044.
Patented Aug. 1, 1916.
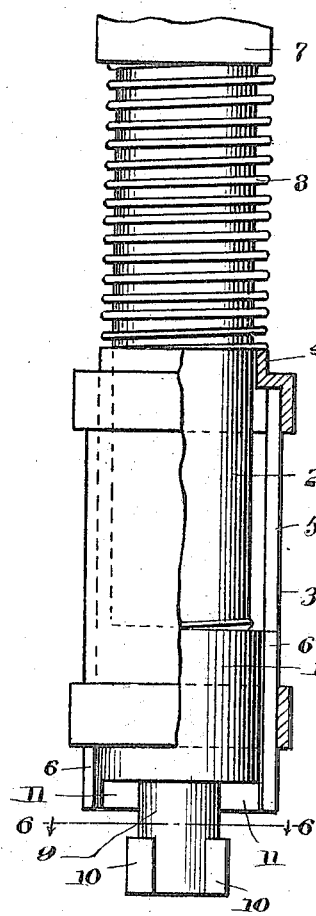
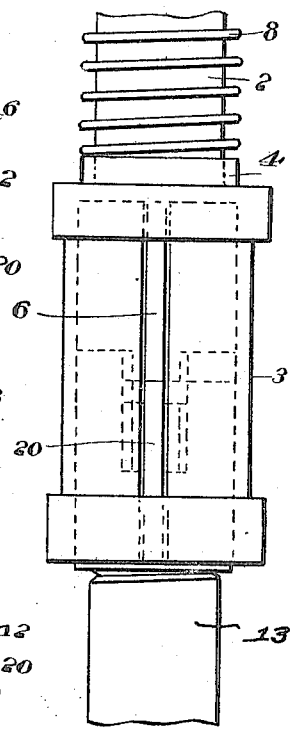
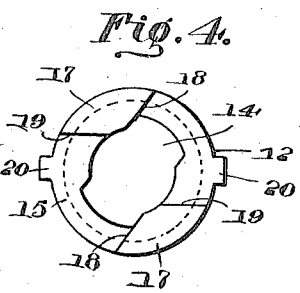
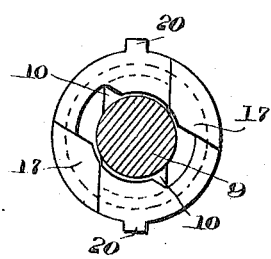
Witnesses
Charlotte Sandage
John Mountain
Inventor
Albinus H. Minnich
By George J. Oltsch
Attorney

UNITED STATES PATENT OFFICE.

ALBINUS H. MINNICH, OF SOUTH BEND, INDIANA.

ROD OR PIPE COUPLING.

1,193,044. Specification of Letters Patent. Patented Aug. 1, 1916.

Application filed August 8, 1914. Serial No. 855,729.

*To all whom it may concern:*

Be it known that I, ALBINUS H. MINNICH, a citizen of the United States, residing at South Bend, in the county of St. Joseph and State of Indiana, have invented certain new and useful Improvements in Rod or Pipe Couplings, of which the following is a specification.

The invention relates to an improvement in couplings, designed particularly for expeditiously and securely connecting rod or pipe sections in making up boring rods in well drilling operations.

The main object of the present invention is the provision of a coupling, in which the respective members are interlocked by a partial relative rotation after connection, and in which the male member of the coupling is provided with means for automatically interlocking with the female member to prevent a reverse rotary movement.

The invention in its preferred form of details will be described in the following specification, reference being had particularly to the accompanying drawings, in which:—

Figure 1 is a view in elevation, partly in section, showing the male member of the coupling in place on a pipe or rod section. Fig. 2 is a bottom plan of the same. Fig. 3 is an elevation, showing the female member in place on a pipe or rod section. Fig. 4 is a plan or end view of the same. Fig. 5 is a broken view in elevation showing the members in coupled relation. Fig. 6 is an end view of the female member with the male member shown in section below the line 6—6 of Fig. 1.

Referring particularly to the accompanying drawings, the improved coupling comprises a male member, including a coupling section 1 formed with an interiorly threaded opening, to be secured upon the lower end of the pipe or rod 2 with which the coupling is to coöperate. Slidably mounted upon the coupling section 1 is a sleeve 3, which at the upper end is reduced in diameter as at 4, to slidably fit the pipe section 2. The sleeve 3 is formed with diametrically opposed slots 5, extending throughout the length thereof except for the upper reduced portion of the fitting, and the coupling section 1 is correspondingly formed with diametrically opposed ribs 6 to fit in said slots. This construction provides for a free endwise movement of the sleeve with respect to the section 1, but prevents independent rotary movement thereof. Secured upon the rod or pipe section 2, in spaced relation to the relatively upper end of the sleeve 4, is a collar 7, between which and the sleeve is arranged a tension spring 8, coiled about the pipe and normally exerting pressure upon the sleeve to force the latter toward the section 1. The lower end of the section 1 is formed with a projection 9, of approximately circular shape provided on its lower end with diametrically opposed wings 10. The lower end of the section 1 beyond the projection stem 9 is formed with diametrically opposed concentrically arranged abutments 11, which abutments are alined diametrically of the member 1 with the wings 10, but disposed beyond the same in both directions.

The female member of the coupling comprises a section 12, formed at one end for threaded connection with a pipe or rod section 13, which it is designed to connect to the section 2. The end of the coupling section 12, remote from the pipe 13, is formed with an opening 14 corresponding to the size and shape of the end of the stem 9, that is said opening 14 is of a size to permit the entrance of the stem and wings therethrough. Below the end wall 15 of the section 12 of the coupling, I form or provide a shoulder 16 coextensive with the circumferential length of the member of the section, this shoulder forming in effect the underside of the top wall of the section. On the upper end of the section 12 immediately beyond the opening 14 are arranged in diametrically opposed relation, angular abutments 17, the relatively inner proximate edge of each of which is in coincidence with that portion of the opening corresponding to the shape of the stem 9, from which the remaining edges extend on angularly related lines diverging from the opening. The corresponding edges of the abutments, as 18, extend on parallel lines in opposite directions from the center of the section and in coincidence with the edge of the opening 14, while the opposing edges 19 of the abutments project in opposite directions on parallel lines, but directly away from the edge of the opening 14. As thus constructed, the abutments provide what might be termed channels in the upper surface of the section 12, each channel opening from the edge of the section toward the center and having one side marginal edge thereof coincident with the opening in the section, and the opposing marginal edge diverging from the edge of the opening. The section 12 is further provided with diametrically opposing longitudinally extending ribs 20, of a size to coöperate with the slots 5 in the sleeve 3.

In the operation of connecting the respective coupling members, assuming each to be secured to the rod sections which it is desired to join, the winged end of the stem 9 of the male member is passed through the opening 14 of the female member, the abutments 11 of the male member resting in the channels between the abutments 17 of the female member, and in contact with the edges 18 thereof. After the stem has been passed through the opening to arrange the wings beneath the lower surface of the wall, the parts are given relatively rotary movement until the abutments 11 contact with the edges 19 of the respective abutments 17 of the female member. In this position the wings will be locked beneath the end wall of the female member and the ribs 20 of such female member will be in line with the ribs 6 of the male member. The sleeve, which has been held elevated during the coupling operation described, is now released and the spring acts to force the same lengthwise the male and female members, with the slots of the sleeve coöperating with the ribs 6 and 20.

It is obvious from this construction that the coupling may be conveniently and expeditiously operated by simple partial rotary movement of the respective members, or of either member, after their initial placement, as described, and that coincident with the movement described, the sleeve will automatically act to lock the respective sections in such position to prevent a reverse rotary movement. The parts may be readily disconnected in an obvious manner by first elevating the sleeve, reversing the rotary movement until the abutments 11 contact with the opposing edges 18 of the abutments 17 when the parts are in position for endwise separation.

What is claimed is:—

1. A coupling comprising a male member and a female member, the male member having locking abutments and limiting abutments, the female member being formed with a shoulder beneath which the locking abutments are adapted to seat and with spaced shoulders against which the limiting abutments are adapted to seat, ribs carried on the respective members and adapted to aline when the limiting abutments of the male member engage the shoulders of the female member, and a single locking means engaging the alined ribs on the members to prevent independent relative rotation thereof.

2. A coupling comprising a male member and a female member, the male member having locking abutments and limiting abutments, the female member being formed with a shoulder beneath which the locking abutments are adapted to seat and with spaced shoulders against which the limiting abutments are adapted to seat, ribs carried on the respective members and adapted to aline when the limiting abutments of the male member engage the shoulders of the female member, and a single locking means engaging the alined ribs on the members to prevent independent relative rotation thereof, the female member being formed with positioning shoulders adapted to be engaged by the limiting abutments when the locking abutments of the male member are positioned for disconnection from the female member.

3. A coupling including a male member, a spring pressed sleeve encircling the male member and a wing stem carried by the male member, a female member having an opening corresponding in size and shape to the winged stem, the female member below the outer edge of the opening being undercut to provide locking shoulders to receive the wings upon relative rotation of the members subsequent to connection, means carried by the female member to interlock with the sleeve subsequent to the relative rotary movement of the members, limiting abutments carried by the female member and coöperating stops carried by the male member, whereby relative rotation of the respective members in either direction is limited to dispose the parts in locked or unlocked positions.

In testimony whereof I affix my signature in presence of two witnesses.

ALBINUS H. MINNICH.

Witnesses:
L. W. COOK,
GEORGE J. OLTSCH.

Copies of this patent may be obtained for five cents each, by addressing the "Commissioner of Patents, Washington, D. C."